US012682046B1

(12) United States Patent
Chu

(10) Patent No.: US 12,682,046 B1
(45) Date of Patent: Jul. 14, 2026

(54) ACCELERATION OF THREAT ASSESSMENT AND REMEDIATION ANALYSIS (TARA) USING COUNTERMEASURES IN AUTOMOTIVE SECURITY

(71) Applicant: VicOne Corporation, Tokyo (JP)

(72) Inventor: Yi-Hong Chu, Taipei (TW)

(73) Assignee: VicOne Corporation, Tokyo (JP)

( * ) Notice: Subject to any disclaimer, the term of this patent is extended or adjusted under 35 U.S.C. 154(b) by 104 days.

(21) Appl. No.: 18/736,205

(22) Filed: Jun. 6, 2024

(51) Int. Cl.
*G06F 21/00* (2013.01)
*G06F 21/55* (2013.01)
*G06F 21/57* (2013.01)

(52) U.S. Cl.
CPC ............ *G06F 21/55* (2013.01); *G06F 21/577* (2013.01)

(58) Field of Classification Search
CPC .............................. G06F 21/577; G06F 21/55
USPC .......................................................... 726/22
See application file for complete search history.

(56) References Cited

U.S. PATENT DOCUMENTS

| 2024/0202345 A1* | 6/2024 | Asai ...................... | G06F 21/577 |
| 2025/0308240 A1* | 10/2025 | Singh ..................... | G06V 20/52 |
| 2025/0310369 A1* | 10/2025 | Guo ..................... | H04L 63/1433 |

FOREIGN PATENT DOCUMENTS

| CN | 111985789 A | * 11/2020 | ........... G06F 16/248 |

* cited by examiner

*Primary Examiner* — Josnel Jeudy
(74) *Attorney, Agent, or Firm* — Beyer Law Group LLP

(57) ABSTRACT

A threat assessment and remediation analysis (TARA) modeling process includes a threat intelligence database, a threat scenario builder and a countermeasure advisor. An item definition is either a vehicle or an electronic control unit (ECU). If a vehicle, its features are extracted and are converted into an input feature vector. If ECU, its parameters are extracted and converted into an input feature vector. The input feature vector is compared to a feature space of the threat intelligence database that includes any number of feature vectors representing potential attack paths of the vehicle or ECU. The feature vectors closest to the input feature vector are matched and these are output as potential threat scenarios. A countermeasure advisor selects an appropriate countermeasure for each matched feature vector using records in the threat intelligence database and outputs each appropriate countermeasure as a new asset. The countermeasures are downloaded to the vehicle during assembly.

20 Claims, 13 Drawing Sheets

→ Prerequisites  - → Supporting  ⤳ Feedback

TARA Modeling Process

**Review & Revise
(Regular monitoring, Incident response**

TARA Iteration

TARA Modeling Process with Threat Intelligence

| Threat Scenario ID | Threat Scenario | Path ID | Attack Path | Damage ID |
|---|---|---|---|---|
| APP-2 | Sensitive Information Exposure | P67.12 | Attacker access by Hardware Additions AND break off booting script to gain normal user privilege AND access data under userdata partition | A010D1 |
| | | | | A010D2 |
| | | | | A011D1 |
| | | | | A011D2 |
| | | P67.13 | Attacker access by Hardware Additions AND trigger vulnerable software to gain normal user privilege AND access data under userdata partition | A010D1 |
| | | | | A010D2 |
| | | | | A011D1 |
| | | | | A011D2 |

402  404  406  408  410

Attack Paths of Threat Scenario Stored in Threat Intelligence Database

FIG. 6A

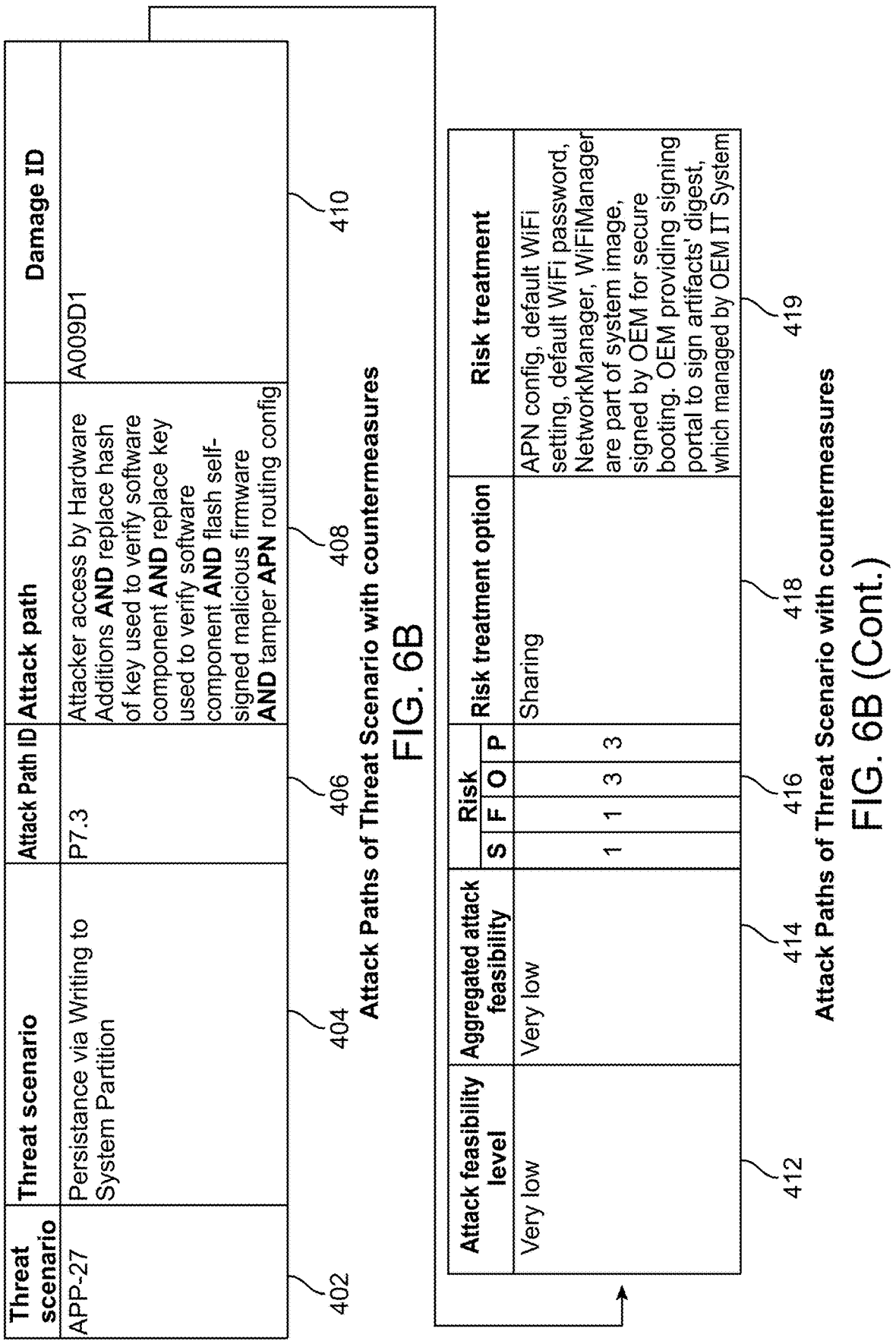

| Threat scenario | Threat scenario | Attack Path ID | Attack path | Damage ID |
|---|---|---|---|---|
| APP-27 | Persistance via Writing to System Partition | P7.3 | Attacker access by Hardware Additions AND replace hash of key used to verify software component AND replace key used to verify software component AND flash self-signed malicious firmware AND tamper APN routing config | A009D1 |

402     404     406     408     410

Attack Paths of Threat Scenario with countermeasures

FIG. 6B

| Attack feasibility level | Aggregated attack feasibility | Risk | | | Risk treatment option | Risk treatment |
|---|---|---|---|---|---|---|
| | | S | F | O | P | | |
| Very low | Very low | 1 | 1 | 3 | 3 | Sharing | APN config, default WiFi setting, default WiFi password, NetworkManager, WiFiManager are part of system image, signed by OEM for secure booting. OEM providing signing portal to sign artifacts' digest, which managed by OEM IT System |

412     414     416     418     419

Attack Paths of Threat Scenario with countermeasures

FIG. 6B (Cont.)

| Asset ID | Asset Name | Asset Type | Description | Location | Security Property | Damage ID | Damage Scenario |
|---|---|---|---|---|---|---|---|
| 420 | 422 | 424 | 426 | 428 | 430 | 432 | 434 |
| A010 | IDPS setting | Data | IDPS module setting | TEE Secure Storage | Integrity | A012D1 | Improper IDPS setting fail to protect the system as expected and the system is vulnerable to attack |
|  |  |  |  |  | Availability | A012D2 | IDPS function cannot start |
| A011 | IDPS rules | Data | IDPS rules | TEE Secure Storage | Integrity | A013D1 | IDPS rules fail to protect the system as expected and the system is vulnerable to attack |
|  |  |  |  |  | Availability | A011D2 | Empty WiFi AP password causes WiFi to be unable to turn on |
| A012 | TEE Secure Storage Key | Key | Derived Key for enabling TEE Secure Storage | TEE | Availability | A012D1 | TEE Secure Storage cannot be functional |

New Countermeasures Recommended by Countermeasure Advisor

FIG. 7

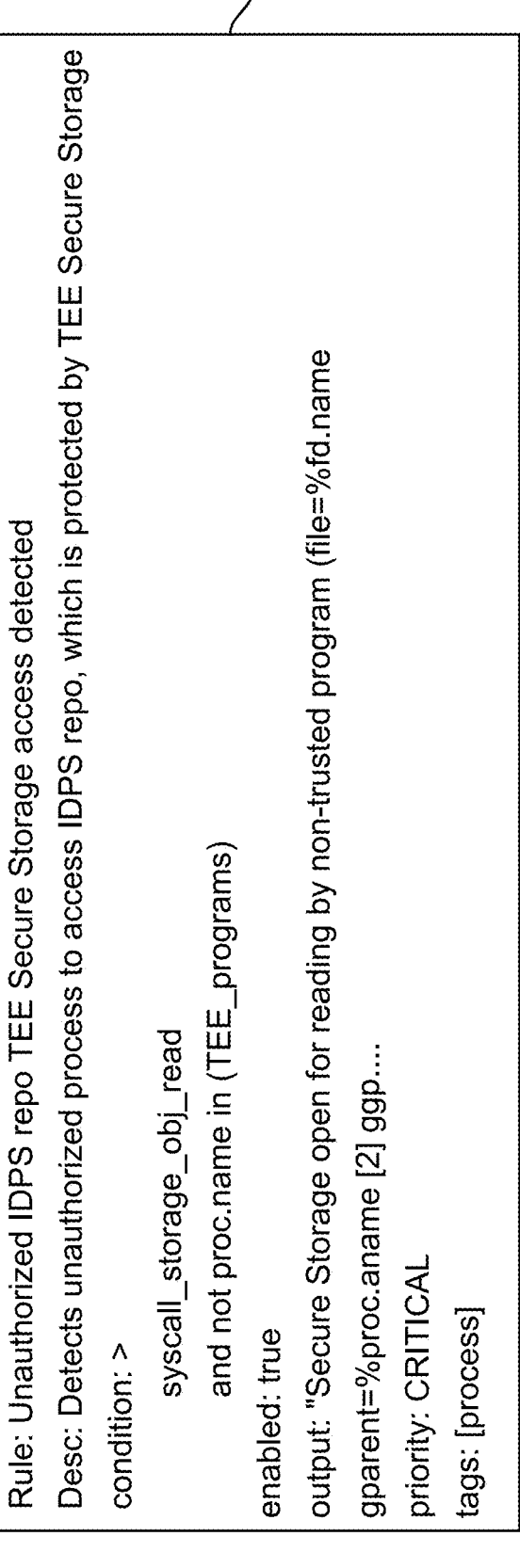

Rule: Unauthorized IDPS repo TEE Secure Storage access detected

Desc: Detects unauthorized process to access IDPS repo, which is protected by TEE Secure Storage condition: > syscall_storage_obj_read and not proc.name in (TEE_programs)

enabled: true output: "Secure Storage open for reading by non-trusted program (file=%fd.name gparent=%proc.aname [2] ggp....

priority: CRITICAL tags: [process]

Rule Recommended by Countermeasure Advisor

FIG. 8

System Flow Diagram

Attack Paths

ACCELERATION OF THREAT ASSESSMENT AND REMEDIATION ANALYSIS (TARA) USING COUNTERMEASURES IN AUTOMOTIVE SECURITY

FIELD OF THE INVENTION

The present invention relates generally to automotive cyber security. More specifically, the present invention relates to threat assessment and remediation analysis (TARA).

BACKGROUND OF THE INVENTION

A connected vehicle can communicate with devices or systems that are external to the vehicle. Most new vehicles on the market today are connected in that they have components that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for a central gateway, an ECU for in-vehicle information and entertainment, an ECU for engine management, etc. ECUs are computers with software and hardware components. More particularly, an ECU has a processor that executes software components, such as an operating system, application programs, and firmware.

Cyber security, within the context of connected vehicles, is the protection of automotive electronic systems, communication networks, control algorithms, software, users, and underlying data from malicious attacks, damage, unauthorized access, or manipulation. Connected vehicles are susceptible to cyber attacks, which include unauthorized intrusion, malware infection, etc. Unfortunately, traditional information technology (IT) cyber security measures are not readily adaptable to connected vehicles because a typical ECU is not as powerful as computers employed in the general IT environment. Furthermore, connected vehicles have different attack surfaces than general IT environments.

With the mandatory requirement of UNECE R155, vehicle manufacturers need to effectively manage cyber security throughout the product lifecycle of vehicles and electronic control units (ECUs). ISO 21434 as the best practice for implementing UNECE R155 recommends using TARA (Threat Assessment and Remediation Analysis—an engineering methodology used to identify and assess cyber vulnerabilities and select countermeasures effective at mitigating those vulnerabilities) as the foundation tool for managing cyber security risks.

FIG. 1 illustrates an example of a TARA modeling process. A pre-modeling step of TARA is "Item Definition;" an "item" could be a vehicle or an ECU depending on the modeling scope. The item serves as input to TARA modeling at two points, Start 10 or Alternate Start 12. Most TARA modeling starts with asset identification 20 because an item is already defined as known; it is more intuitive for a software/hardware designer to break down the item into assets by analyzing its CIA (Confidentiality, Integrity, Availability) attributes. An "asset" refers to any component, system, or data within a vehicle that has value and requires protection from potential threats, such as software, hardware, ECUs, files, etc. Assets can vary widely and may include: vehicle components (physical parts of the vehicle such as an ECU, braking system, steering system, IVI system, and communication modules); software (operating systems, firmware, applications, countermeasure software, rules, custom code); data (data stored or transmitted by the vehicle, such as sensitive user information, diagnostic data, or operational data (e.g., speed, fuel level); and connectivity (systems and protocols enabling external communication over cellular networks, Wi-Fi, Bluetooth, and vehicle-to-vehicle or vehicle-to-infrastructure communication.

After the asset is identified, it is prepared for damage scenario identification 22 by analyzing whether any CIA attributes of the asset have been compromised, and then mapping the possible threats to damage scenarios. An impact rating 24 is determined along with the risk value 32 of the threats, leading to a risk treatment 36 recommendation. This approach is feasible when the threats involve fewer possible damage scenarios. When the attack chain becomes complex, i.e., multiple damage scenarios with multiple assets interacting, this asset-based analysis method becomes very inefficient. In this case, TARA modeling can also start 12 with threat scenario identification 26, using threat intelligence to accelerate asset identification and model design in order to identify possible attack paths 28 and attack feasibility 30.

FIG. 2 illustrates an example TARA iteration of design and implementation of a cyber security system. In practice, TARA results need to be reviewed and the system revised during system design, implementation, test and validation. If new risks are identified and new assets are introduced, the system needs to be redesigned, reworked, and tested, a lengthy process which can negatively impact the time-to-market of the final product.

Accordingly, new methods and apparatuses are desired that will speed up a TARA modeling process in the automotive industry.

SUMMARY OF THE INVENTION

To achieve the foregoing, and in accordance with the purpose of the present invention, a methodology is disclosed that accelerates threat assessment and remediation analysis (TARA) in automotive security.

This invention describes a comprehensive approach to accelerate TARA modeling by utilizing intrusion detection and prevention solution (IDPS) rules and other countermeasures automatically derived from threat intelligence in order to reduce iterations in the design phase of an automotive cyber security system.

The invention describes an alternative process of TARA modeling using threat intelligence. With threat intelligence input, we perform TARA modeling and recommend countermeasures simultaneously when facing a complex attack chain.

The present invention provides a novel approach that confers several advantages, including but not limited to: accelerating TARA modeling at every phase (design, implementation, test, validation, post-production, continuous monitoring); accelerating system design by utilizing threat intelligence recommended hardware, software, data, and related configurations; and accelerating a system audit function with generated IDPS rules and configuration. Regarding the system audit function, in practice, a vehicle (onboard) ECU and a backend OEM server implements system audit function. The backend server sends telemetry requests to the ECU, the ECU collects system security event data, including IDPS logs, and then responds back to the OEM server. The OEM server designs which events need to be monitored based on risk assessment results and generates relative IDPS rules.

BRIEF DESCRIPTION OF THE DRAWINGS

The invention, together with further advantages thereof, may best be understood by reference to the following description taken in conjunction with the accompanying drawings in which:

FIG. 6A is an example of threat intelligence-generated threat scenarios including attack paths found in a database.

FIG. 6B is another example of threat intelligence-generated threat scenarios including attack paths found in a database with countermeasures.

FIG. 7 is an example of new assets (i.e., countermeasures) suggested by countermeasure advisor module.

FIG. 8 is an example of a rule generated by the countermeasure advisor module 350.

DETAILED DESCRIPTION OF THE INVENTION

Figure 1:
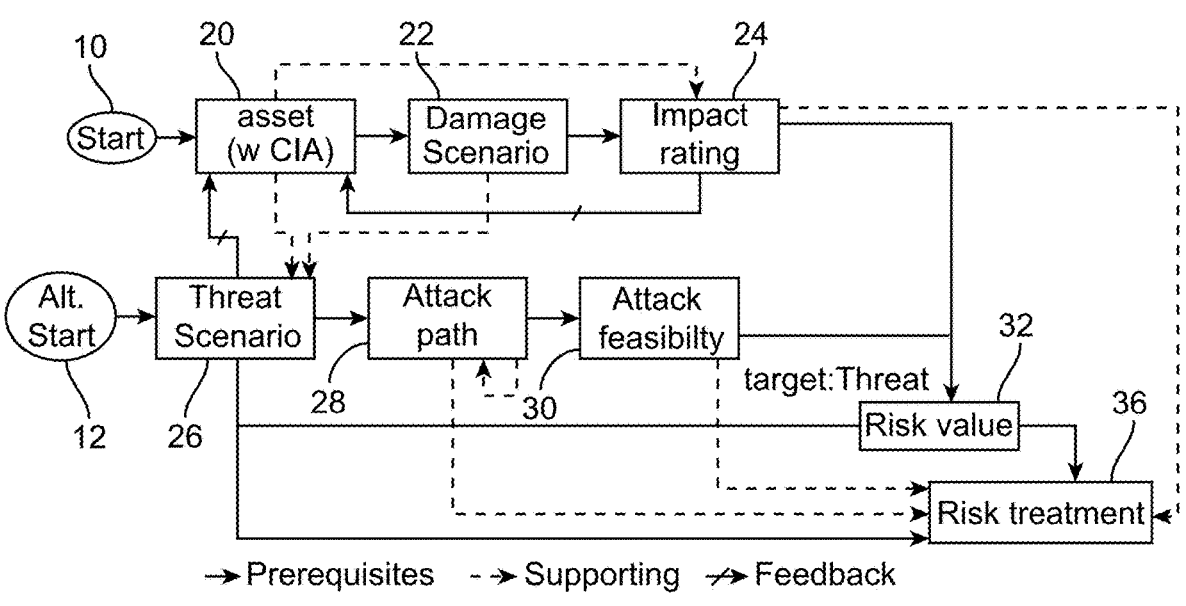
FIG. 1 shows a block diagram of a connected vehicle in accordance with an embodiment of the present invention.
Figure 2:
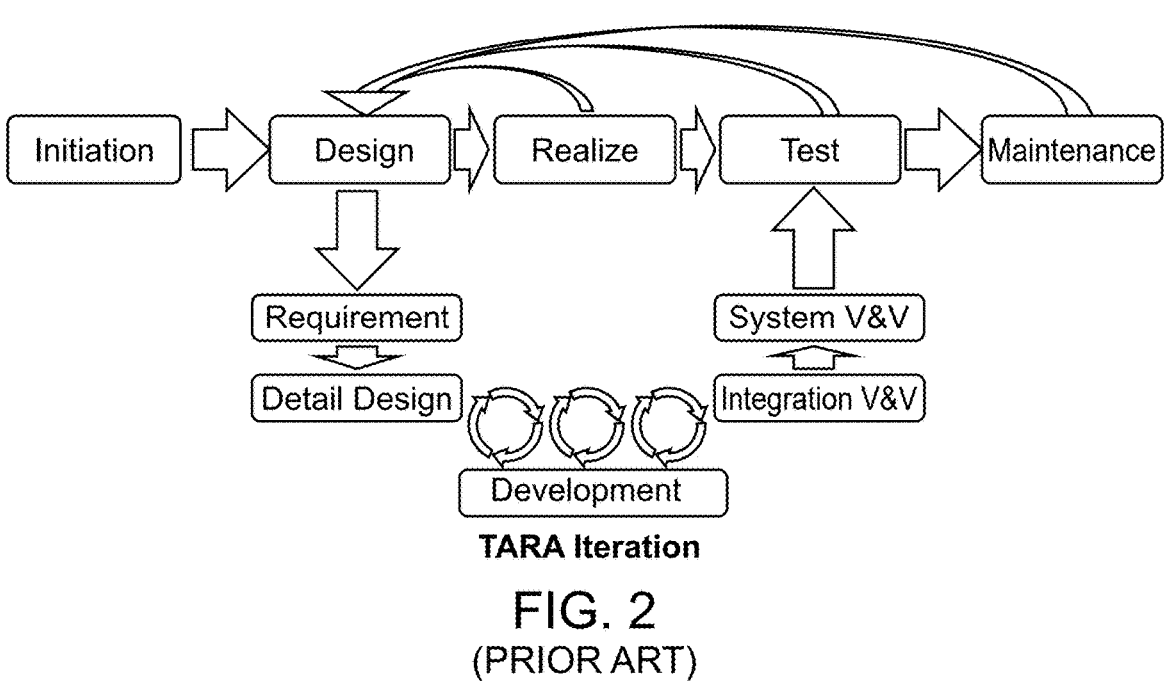
FIG. 2 illustrates an example TARA iteration of design and implementation of a cyber security system.

As mentioned above, TARA is used for modeling. It is realized that there are two existing approaches to incorporating countermeasures into TARA during system design, type A and type B. In type A, a top-down model (designed by OEM and Tier 1 suppliers), suppliers are required to complete sub-functions, which are then integrated and validated by Tier 1. It takes a long time and a lot of expertise to elaborate but can become customized. In type B, a bottom-up model, suppliers provide their own basic cyber security protections which are then integrated by Tier 1 to achieve cyber security goals. Countermeasures may be limited by predefined hardware and software capabilities and protection may not cover all attack surfaces.

There are also other approaches that input the hardware capabilities, analyze weaknesses, and then make recommendations. An analysis, however, that only considers the capabilities of a single piece of hardware is not comprehensive enough. Most proposed solutions are difficult to implement, do not provide complete protection, and there is insufficient evidence that they mitigate the risk of real threats.

We realize that threat intelligence collects and analyzes information about potential or current threats aimed at exploiting vulnerabilities of systems. We further realize that threat intelligence can also help OEM and Tier 1 understand the adversaries they face, anticipate their moves, and enhance preparedness in defending against targeted attacks. In the TARA modeling process, a threat intelligence database can be important input information to identify threat scenarios, and also can play an important role in risk treatment planning.

Therefore, we realize that threat intelligence can be incorporated into automotive cyber security system design as early as possible by foreseeing risk and countermeasures in advance in order to speed up the overall timeline. Therefore, this invention details a holistic method of integrating countermeasure design early in the TARA modeling process (during the system design phase) by inputting vehicle features and ECU parameters, e.g. ECU categories, basic features, HBOM (Hardware Bill of Materials) and SBOM (Software Bill of Materials) into a threat scenario builder in order to recommend best practices for countermeasures, such as IDPS functions and rules.

We reduce the possibility of discovering cyber security risks late in the validation phase and then having to return to the design phase to modify the design and introduce countermeasures. Our approach recommends excluding vulnerable or high-risk software packages during TARA modeling, thereby avoiding the need to patch, redesign and rework vulnerabilities discovered via scanning later in the implementation, test and validation stages. Our proposed method uses threat intelligence to incorporate countermeasures into the system design early, reducing iterations of the system design, implementation, test and validation cycle to accelerate TARA modeling, further improves system cyber security and reduces risk management costs.

Connected Vehicle Block Diagram

Figure 3:
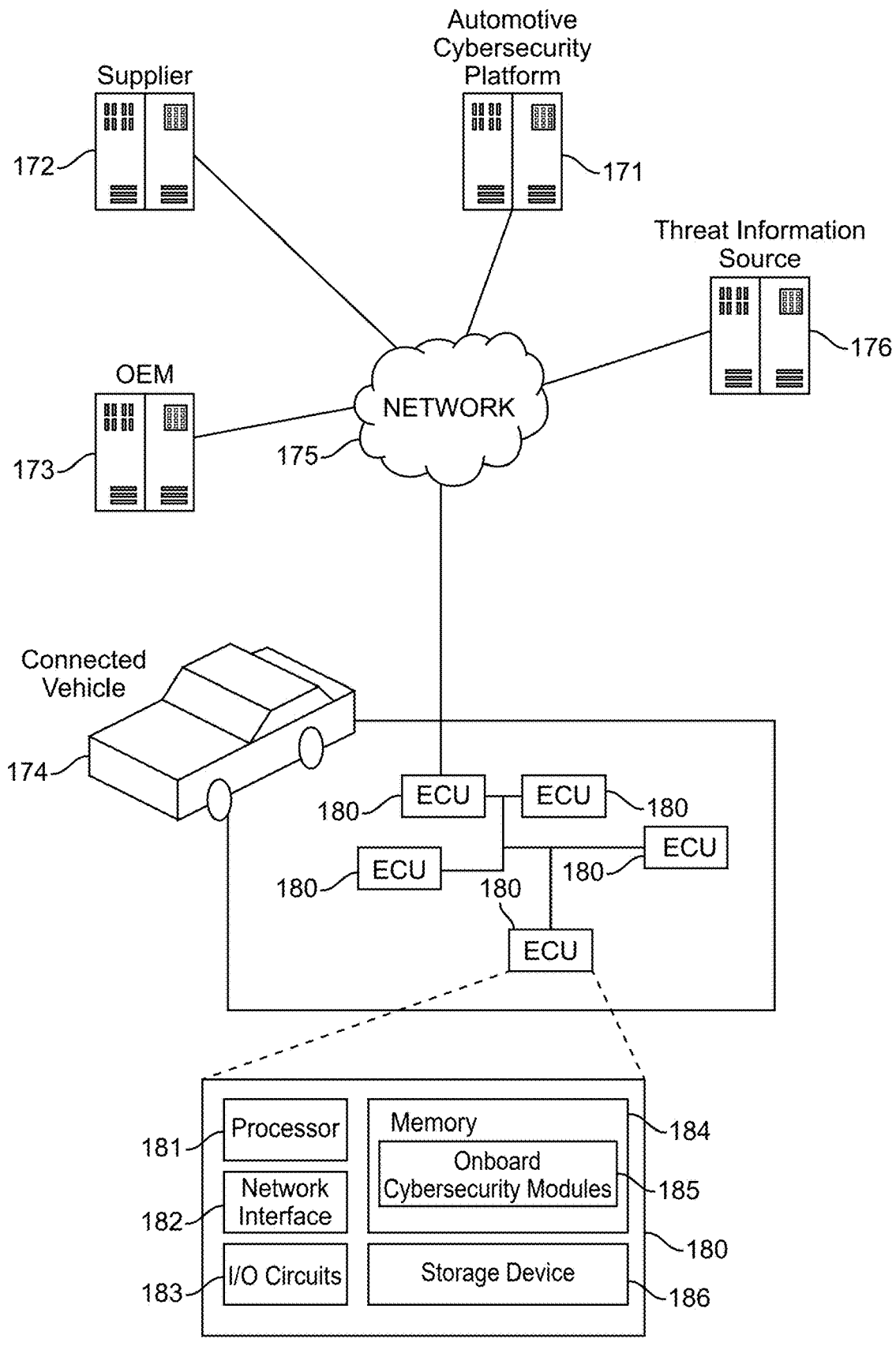
FIG. 3 shows a block diagram of a connected vehicle in accordance with an embodiment of the present invention.

FIG. 3 shows a block diagram of a connected vehicle 174 in accordance with an embodiment of the present invention. FIG. 1 shows a single connected vehicle 174, a single third-party supplier 172, and a single OEM 173 for illustration purposes only. As can be appreciated, there are many OEMs that manufacture connected vehicles that have components sourced from many different third-party suppliers.

The connected vehicle 174 has a plurality of ECUs 180. An ECU 180 may be for engine management or onboard diagnostics (e.g., OBD II), may help implement a safety system, a body system, a chassis system, a power system, remote keyless entry, vehicle-to-everything (V2X) interfaces etc., and may also be referred to as a telematics control unit (TCU), an in-vehicle information and entertainment ("infotainment") (IVI) system, a central gateway, or a Global Navigation Satellite System (GNSS). One or more of the ECUs 180 and associated software components may be provided by the supplier 172 to the OEM 173, which is the manufacturer of the connected vehicle 174. The supplier 172 may provide firmware, source code, or other software components by removable storage media (e.g., Universal Serial Bus, flash storage) or over a communication network 175, which includes the Internet in this example. Each of the OEM 173 and the supplier 172 is depicted as a computer system to indicate that the OEM 173 and the supplier 172 may send and receive software components and communicate with the connected vehicle 174 over the network 175. Preferably, a TARA modeling process as described below that utilizes a threat intelligence database and introduces countermeasures early in the design phase is implemented on a computer at OEM 173. TARA modeling is implemented here during any of the phases of system design, implementation, test and validation, before the vehicle is in production. Any new countermeasures recommended by the novel TARA modeling process are stored in a countermeasure database and then downloaded to a particular vehicle during production on an assembly line and before delivery to the customer.

An ECU 180 is a computer comprising at least one processor 181, a memory 184, one or more network interfaces 182 for connecting to an internal or external communication network, and one or more input/output (I/O) circuits 183. An I/O circuit 183 may be a data acquisition and control circuit, a sensor interface, or other circuit for receiving data from external sources, such as data from other connected vehicles, sensed data of the environment outside the connected vehicle 174, etc. The memory 184 may be non-volatile memory (e.g., non-volatile random access memory "NVRAM") or volatile memory (e.g., dynamic random access memory "DRAM). Instructions of one or more onboard cyber security modules 185 and other software components of the ECU 180 may be stored in the memory 184 for execution by the processor 181. A storage device 186 may be a mass storage device, such as solid state drive (SSD). A particular ECU 180 may have fewer or greater components depending on the function of the ECU 180.

An ECU 180 may be connected to other ECUs 180 over an internal (i.e., in-vehicle) communication network, such an Ethernet network or a Controller Area Network (CAN) onboard the connected vehicle 174. An ECU 180 may communicate with external devices outside of the connected vehicle 174 by way of a V2X network, vehicle ad-hoc network (VANET), Wi-Fi, or other external communication network.

An automotive cyber security platform 171 may comprise a computer system with associated software for supporting cyber security procedures in one or more connected vehicles. The cyber security platform 171 may comprise at least one processor and a memory, with the memory storing instructions that when executed by the processor causes the cyber security platform to perform as described herein. The cyber security platform 171, which is external to the connected vehicle 174, may be implemented on a cloud computing platform (e.g., Amazon Web Services "AWS") or other computer system. The cyber security platform 171 may serve as a vehicle security operations center for the connected vehicle 174. The cyber security platform 171 may perform on-the-cloud, offboard (i.e., not on the connected vehicle 174) cyber security procedures for the connected vehicle 174, such as offboard anomaly event detection and offboard correlation.

In the example of FIG. 3, the cyber security modules 185 may be generated at the cyber security platform 171 and provided to the connected vehicle 174 at the factory by the OEM 173, over the communication network 175, or by removable storage media (e.g., USB flash storage). The cyber security modules 185 are configured to perform cyber security procedures as described herein and include countermeasures such as: files, rules, settings, keys, etc. The cyber security modules 185 are onboard in that they are deployed on the connected vehicle 174.

A threat information source 176 may comprise a computer system that provides Common Vulnerabilities and Exposures (CVE) information, news of cyber threats, feedback from a bug bounty program, or other cyber threat intelligence. A vulnerability is a flaw or weakness in a software component (e.g., firmware, application program) or other component of an ECU. A vulnerability may be addressed directly with a patch that fixes the vulnerable component itself or indirectly with a virtual patch. Unlike a patch, a virtual patch does not fix the vulnerable component itself.

Instead, the virtual patch monitors for and blocks an exploit from taking advantage of the vulnerability.

Figure 4:
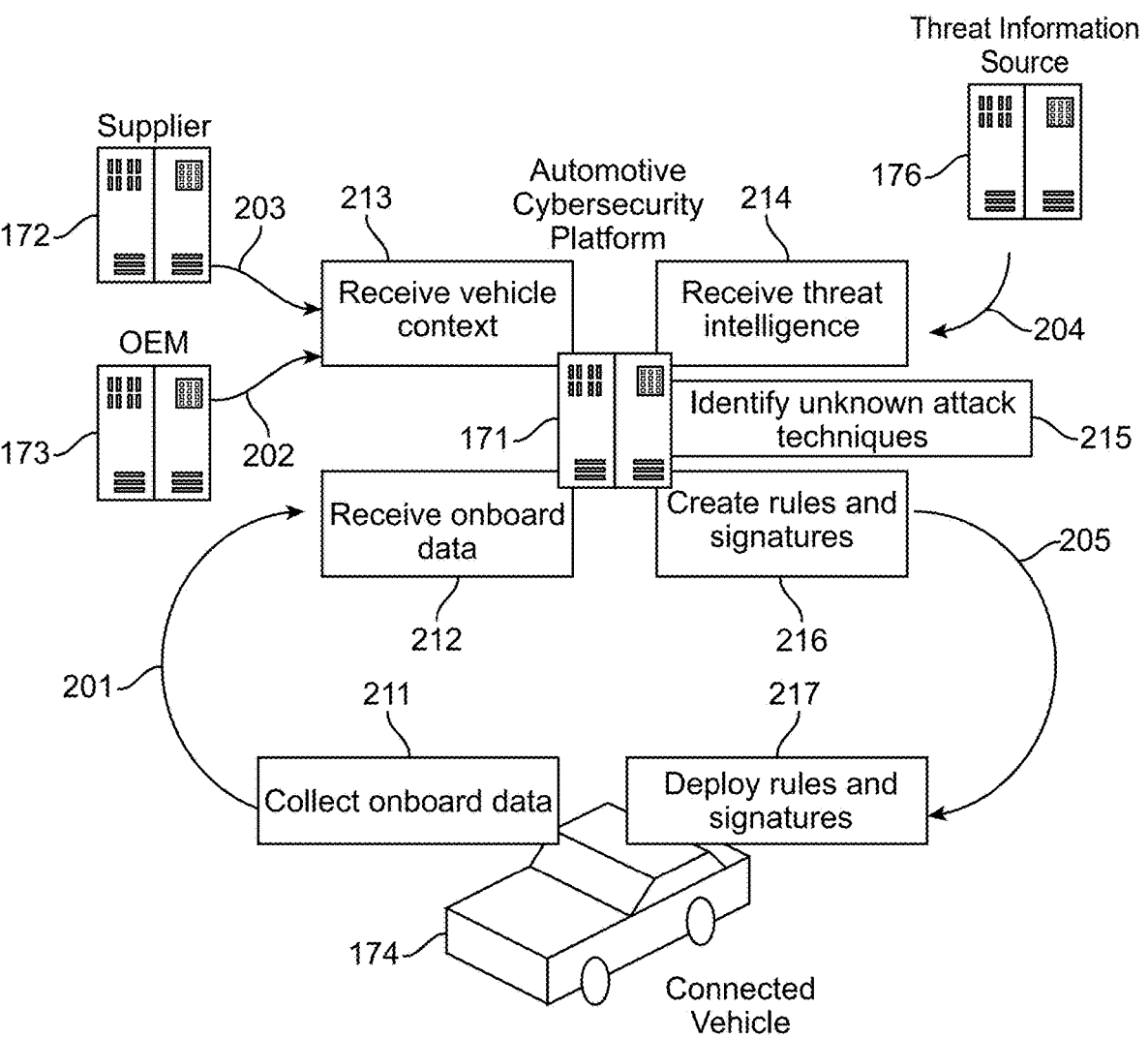
FIG. 4 is a block diagram showing how a connected vehicle interacts with a cyber security platform.

FIG. 4 is a block diagram showing how a connected vehicle 174 interacts with a cyber security platform 171. Data from the vehicle 211 is received by the platform, is processed, and rules, signatures and other countermeasures may be downloaded 205 back to the vehicle number 174. Any new countermeasures developed during the novel TARA modeling process may be downloaded directly from OEM 173 to vehicle number 174 or may be downloaded to the vehicle via the cyber security platform 171 as shown.

Tara Modeling with Threat Intelligence and Countermeasures

Figure 5:
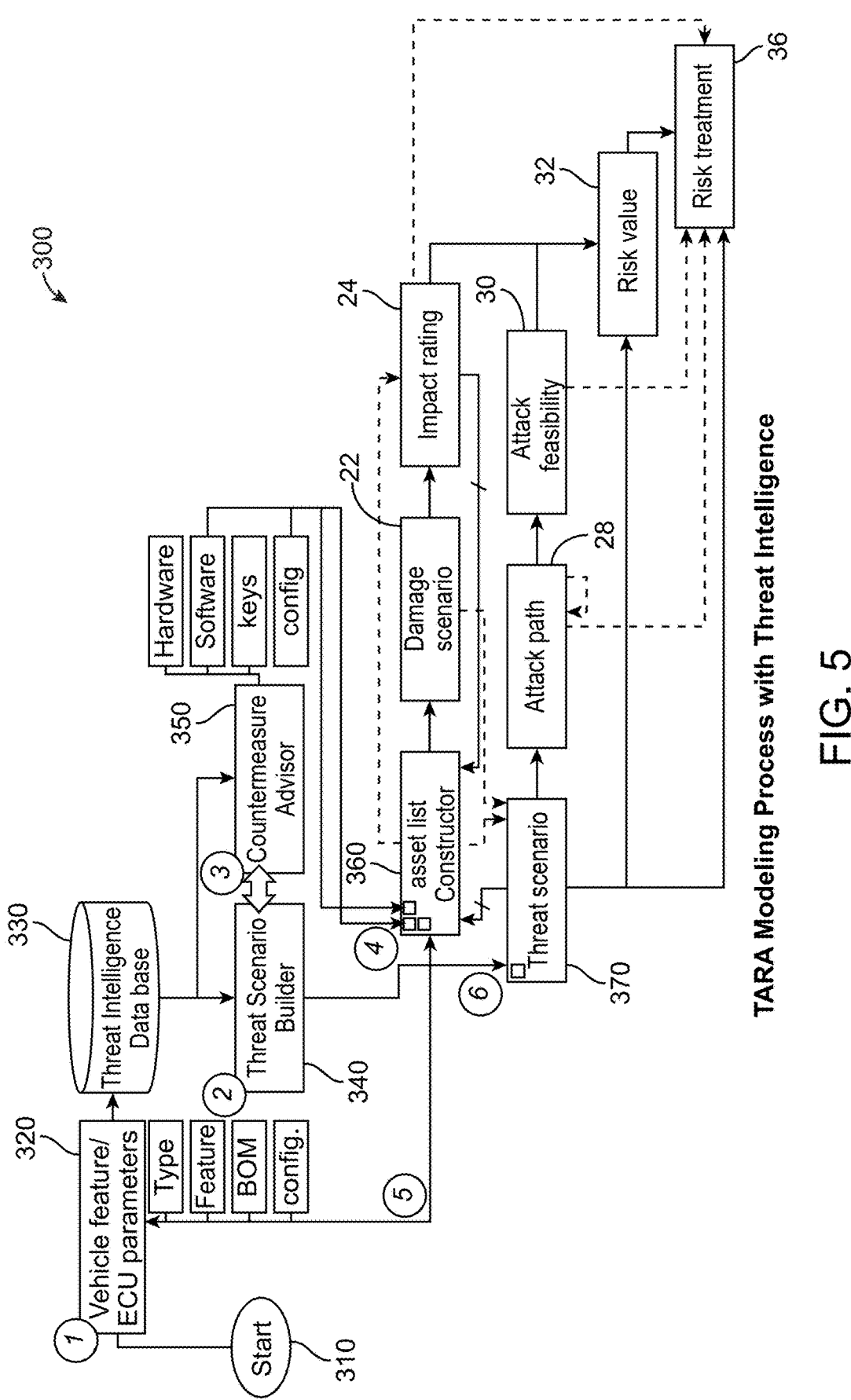
FIG. 5 is a block diagram showing how threat intelligence is integrated with TARA modeling in order to accelerate that process.

FIG. 5 is a block diagram showing how threat intelligence is integrated with TARA modeling in order to accelerate that process. Shown is a starting point 310, a module 320 or modules 320a, b, c that input and extract vehicle features or ECU parameters, a threat intelligence database 330, a module 340 that builds potential threat scenarios, a module 350 that suggests countermeasures, an improved asset list constructor module 360 that accepts multiple inputs, and an improved threat scenarios input 370. Threat intelligence database 330 includes, for each potential threat, a high-dimensional feature vector representing the specific attack path or paths and at least one countermeasure for an attack path. Database 330 may be informed by threat information source 176.

The remaining prior art TARA modeling process from FIG. 1 is shown in blocks 22-36. Advantageously, this improved TARA modeling process 300 not only can accept items from modules 320 but also can accept countermeasures developed in module 350. Further, the threat scenarios input 370 receives input from threat scenario builder 340 developed using the threat intelligence database 330. Details on operation of this improved TARA modeling process will be discussed below with respect to FIG. 9.

FIG. 6A is an example of threat intelligence-generated threat scenarios including attack paths found in database 330. Column 402 are threat scenario identifiers; column 404 is the name of the threat scenario; column 406 is the attack path identifier; column 408 is the particular attack path for a threat scenario; and column 410 are the damage identifiers (which include the asset identifier along with a damage code). Use of these attack paths and identifiers will be discussed in greater detail below. Not shown in this figure is a column holding risk treatments that provide the countermeasure for each particular attack path.

FIG. 6B is another example of threat intelligence-generated threat scenarios including attack paths found in a database along with countermeasures. Column 408 are the attack paths for a particular threat scenario 404; column 412 is the attack feasibility level; column 414 is the aggregated attack feasibility; column 416 are various risks; column 418 is a risk treatment option; and column 419 are the risk treatments, i.e. a countermeasure for each particular attack path. In this example, as shown in column 419, one particular countermeasure for the attack path of column 408 is that the APN configuration, default Wi-Fi setting, default Wi-Fi password, NetworkManager and Wi-FiManager are all part of the system image which are signed by the OEM for secure booting. The second particular countermeasure for this attack path is that the OEM provides a signing portal to sign the artifacts' digest, which is managed by the OEM IT system. By associating one or more countermeasures with a particular attack path in the threat intelligence database in this or a similar manner it is straightforward to reference a countermeasure for a particular attack path.

FIG. 7 is an example of new assets (i.e., countermeasures) suggested by countermeasure advisor module 350. Column 420 are asset identifiers; column 422 are asset names; column 424 are asset types; column 426 are the descriptions of each new asset; column 428 is the location of an asset; column 430 is a particular security property; column 432 are damaged identifiers; and, column 434 are the damage scenarios that describe what will happen if a particular security property of an asset is breached. As shown, assets A010 and A011 each include two possible damage scenarios. Use of these countermeasures will be discussed in greater detail below. New countermeasures A010 and A011 also include a new countermeasure rule described immediately below.

FIG. 8 is an example of a rule 440 generated by the countermeasure advisor module 350. This example will be discussed in greater detail below.

Figure 9:
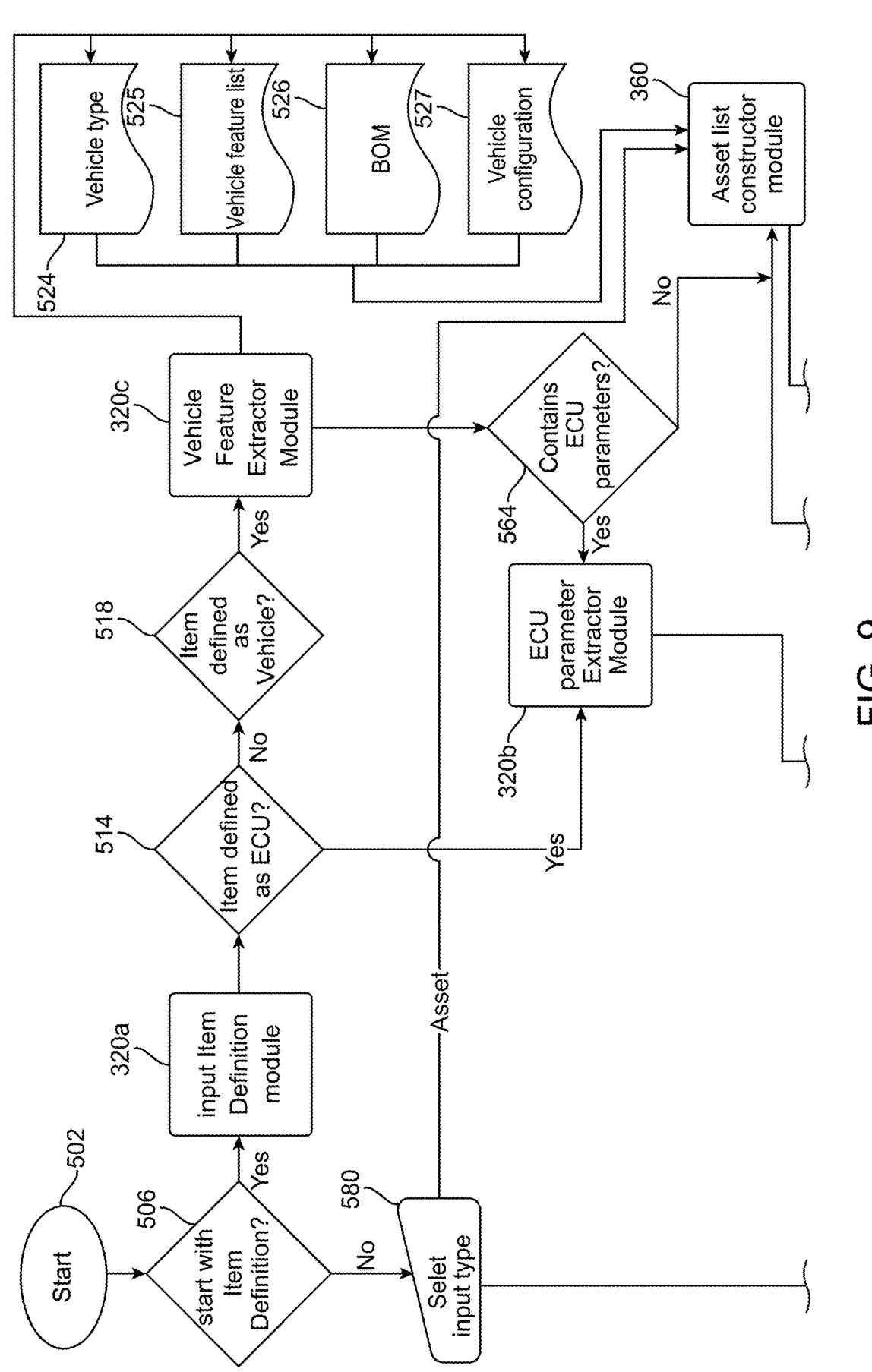
FIG. 9 is a flow diagram describing one embodiment of the improved TARA modeling process of FIG. 5.
Figure 9:
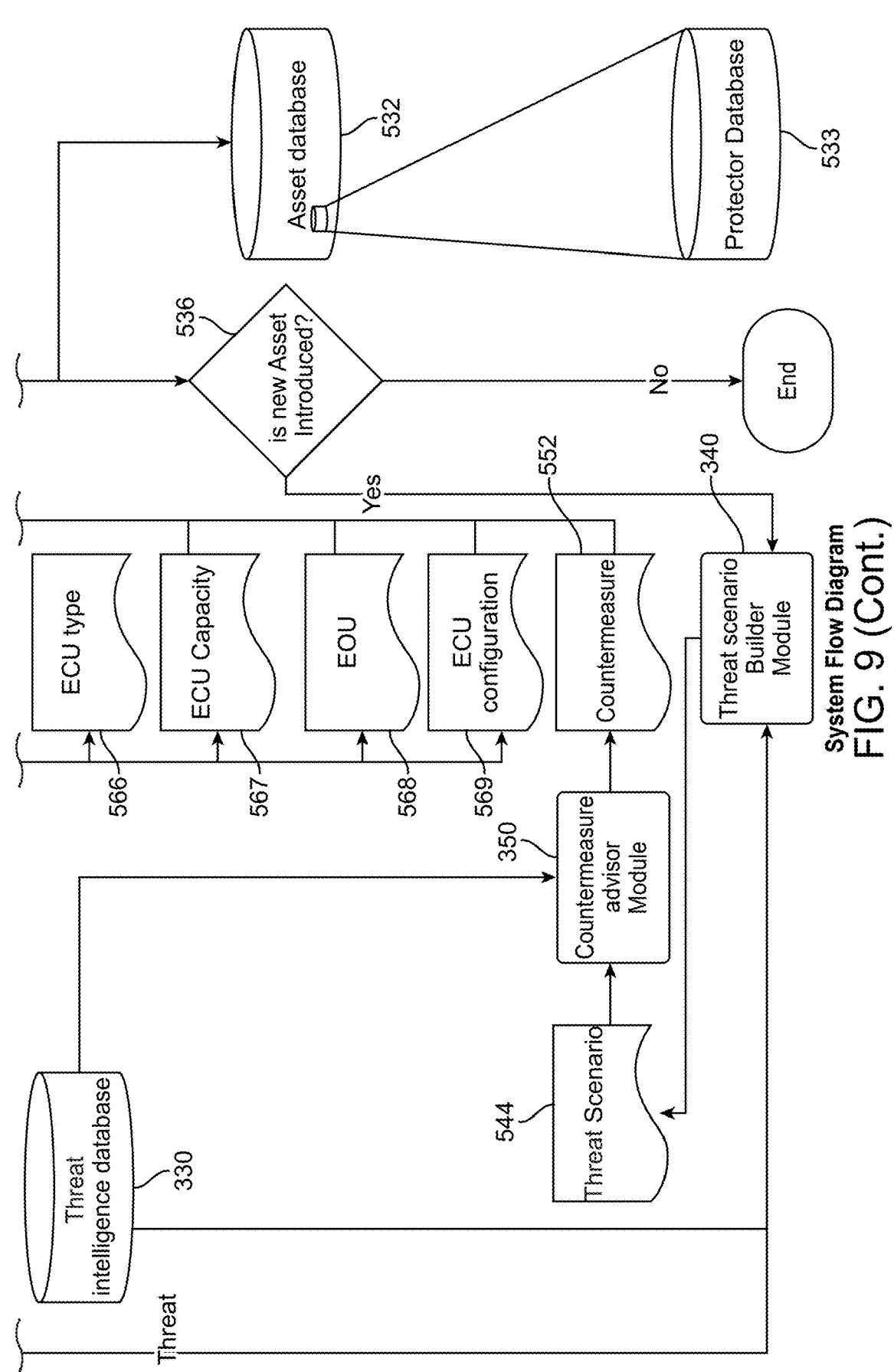

FIG. 9 is a flow diagram describing operation of the improved TARA modeling process 300 of FIG. 5. By inputting vehicle features, ECU parameters, assets or threats directly into the improved TARA modeling process 300 instead of into the prior art process of FIG. 1 various advantages are realized that can address complex attack chains. At start 502 a user such as a cyber security system designer provides input accordingly.

Step 506 determines whether the cyber security system designer of a vehicle or ECU desires to first input an item definition (such as a vehicle or ECU) or desires to input an asset or threat. If an item definition, then module 320a accepts that item definition and control branches depending upon whether the item relates to a vehicle or to an ECU.

Step 514 determines if the item relates to an ECU or its sub-components, if so, then the ECU parameter extractor module 320b extracts parameters 566-569 from the item definition such as: ECU type (Telematics Control Unit, IVI, Gateway, etc.), ECU Features (OTA master, Orchestrator, Wi-Fi AP, Remote Command Broker, DM client, Secure Time Source, External Network Provider, etc.), bill of materials (hardware and software) and Configuration (Hardware Trust Anchor setting, partition table with file system type, network topology, routing table, firewall rules, etc.). These extracted parameters and then passed on to the asset list constructor module 360. An input feature vector for the item is also calculated.

If the item instead relates to a vehicle in step 518, then the vehicle feature extractor module 320c extracts vehicle type (entry-level, medium, luxury, gasoline, diesel, electric, hybrid, etc.) and vehicle features 524-527 such as: Automotive Networking System (number of CANbus, number of CAN-FD, number of Ethernet, number of Flexray, etc.), External Networking System (Cellular UMTS, Cellular LTE, Cellular 5G, C-V2X, etc.), Infotainment feature (OTA update, Remote Control, etc.), regulatory compliance (eCall, R-155, R-156, etc.), bill of materials (hardware and software), Configuration (variant list, network topology, etc.). These extracted features and type are then passed on to the asset list constructor module 360. If this item also contains ECU parameters, then in step 564 these ECU parameters are also extracted by module 320b. An input feature vector for the item is also calculated.

Asset list constructor module 360 adds all assets to an asset database 532. Included within database 532 is a countermeasure database 533 that includes all new countermeasures generated during this modeling process. For example, once a new countermeasure is produced at 552, it is passed to module 360 and then added to the countermeasure database 533. These new countermeasures of the countermeasure database 533 are then downloaded to the vehicle during production so that when the vehicle leaves the factory it has an updated list of countermeasures.

Step 536 determines whether a new asset has been introduced; once a new asset is introduced into the system 300, system 300 will automatically consider it. If a new asset is added by the designer (OEM or Tier 1 suppliers) during asset identification 360 or countermeasure generation 350, then the newly added asset will be included in the vehicle features or ECU parameters, thus leading to another iteration of TARA modeling. If a new asset is introduced through countermeasure module 350, the newly-generated countermeasure 552 will trigger subsequent threat analysis and mitigation recommendations in order to reduce TARA iterations.

For example, if a countermeasure suggested by the system (e.g. "Store IDPS rules under TrustZone enabled Secure Storage") introduces new assets (e.g. "TrustZone enabled Secure Storage," "Secure Storage key," "Secure Storage TA," "Secure Storage CA") into TARA process 300, the system will not simply put only these new assets into TARA, but the damage scenario (e.g. lost integrity of Secure Storage key, TA and CA), threat scenario, risk assessment and countermeasures ("Pinning key inside TrustZone TEE image," "Code signed TA," "Code signed CA") related to the introduced asset will also be added into the TARA process in order to reduce the iterations of TARA modeling. Without our system, new assets introduced by countermeasures need three or more iterations to review and model. Our system can complete that in one iteration.

Threat scenario builder module 340 generates a potential threat scenario 544 (i.e., potential attack paths represented as input feature vectors) based upon designer input (e.g., which item is input). For a typical ECU there will be multiple threats and each threat will have multiple attack paths. Note that the generated potential threat scenario will include the vehicle and ECU levels depending upon whether the TARA modeling is for a vehicle or for an ECU. In other words, the system can support vehicle level TARA and ECU level TARA. So, the threat scenario will not only show an ECU threat (e.g. "ECU is compromised to bypass message authentication") but also give the vehicle level view (e.g. "vehicle is remote control without authentication).

For example, if the input item is an ECU and the extracted parameters are: Telematics Control Unit, External Network Provider, partition table parameters [system: squashfs, userdata: ext4], ARM Cortex-A55, OS is Linux, and IDPS rules), then threat builder module 340 will consider that IDPS rules might be inadvertently placed under the "userdata ext4" partition, which may cause sensitive data to be manipulated, resulting in the ECU and the vehicle to become vulnerable. Module 340 may generate this potential threat scenario 544 as follows (scenario 544 may have multiple attack paths, meaning multiple input feature vectors). In other words, each threat scenario contains multiple attack paths. Each attack path is described by the relationship of multiple nodes (e.g. FIG. 10, 604, 608, 612, 620, 624). Each node is a possibility queried from threat intelligence database 330 by multiple input feature vectors.

When a new item is input into the TARA modeling process 300 (such as the TCU ECU example mentioned directly above), its features or parameters are extracted and converted into an input feature vector by the vehicle feature extraction module 320c and/or ECU parameter extraction module 320b (as the case may be). The extracted parameters for this simple example are shown above, the input feature values not being shown. Next, threat scenario building module 340 maps the input feature vector of the TCU ECU example to a threat intelligence feature space based upon the attack paths stored in threat intelligence database 330, such as is shown in FIG. 6A.

Figure 10:
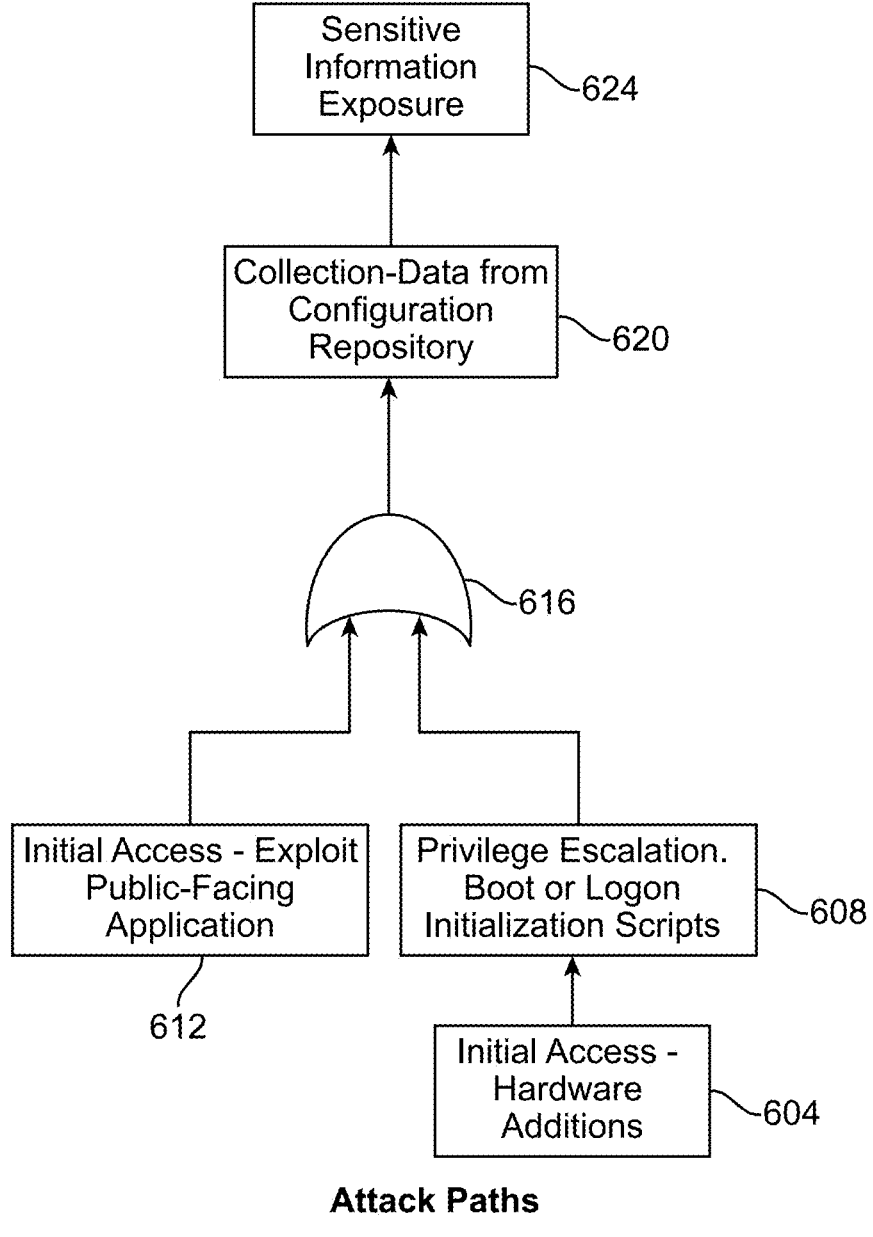
FIG. 10 is an example of a graphic attack tree that illustrates the attack paths of FIG. 6A.

FIG. 6A shows an example of two attack paths stored in threat intelligence database 330 leading to sensitive information exposure. Column 408 describes two different attack paths, both under the same threat scenario 404 of sensitive information exposure. Of course, database 330 may contain any number of attack paths in different categories. FIG. 10 is an example of a graphic attack tree that illustrates the attack paths of FIG. 6A. Shown are particular entry points for first and second attack paths 604, 608 and 612. Both paths then share common features 620 and 624. An attack tree modeler module may be used to create the tree (or others) of FIG. 10.

These attack paths may be encoded using feature vectors, wherein the values in each feature vector represent the feasibility of this attack path. The two feature vectors for these two attack paths are:

{"Initial Access-Hardware Additions": 0.3, "Privilege Escalation-Boot or Logon Initialization Scripts": 0.1, "Collection-Data from Configuration Repository": 1, "Impact-Sensitive Information Exposure": 0.03}
{"Initial Access-Exploit Public-Facing Application": 0.7, "Collection-Data from Configuration Repository": 1, "Impact-Sensitive Information Exposure": 0.7}

Thus, there are two records in database 330 for this particular attack tree because there is an "OR" in the attack tree, meaning there are two possible attack paths. Each record also stores a feature vector for the attack path.

FIG. 6B is another example of threat intelligence-generated threat scenarios including attack paths found in a database with countermeasures. As with the above example, these attack paths may also be encoded using feature vectors and then mapped to the threat intelligence feature space as described immediately below.

Figure 11:
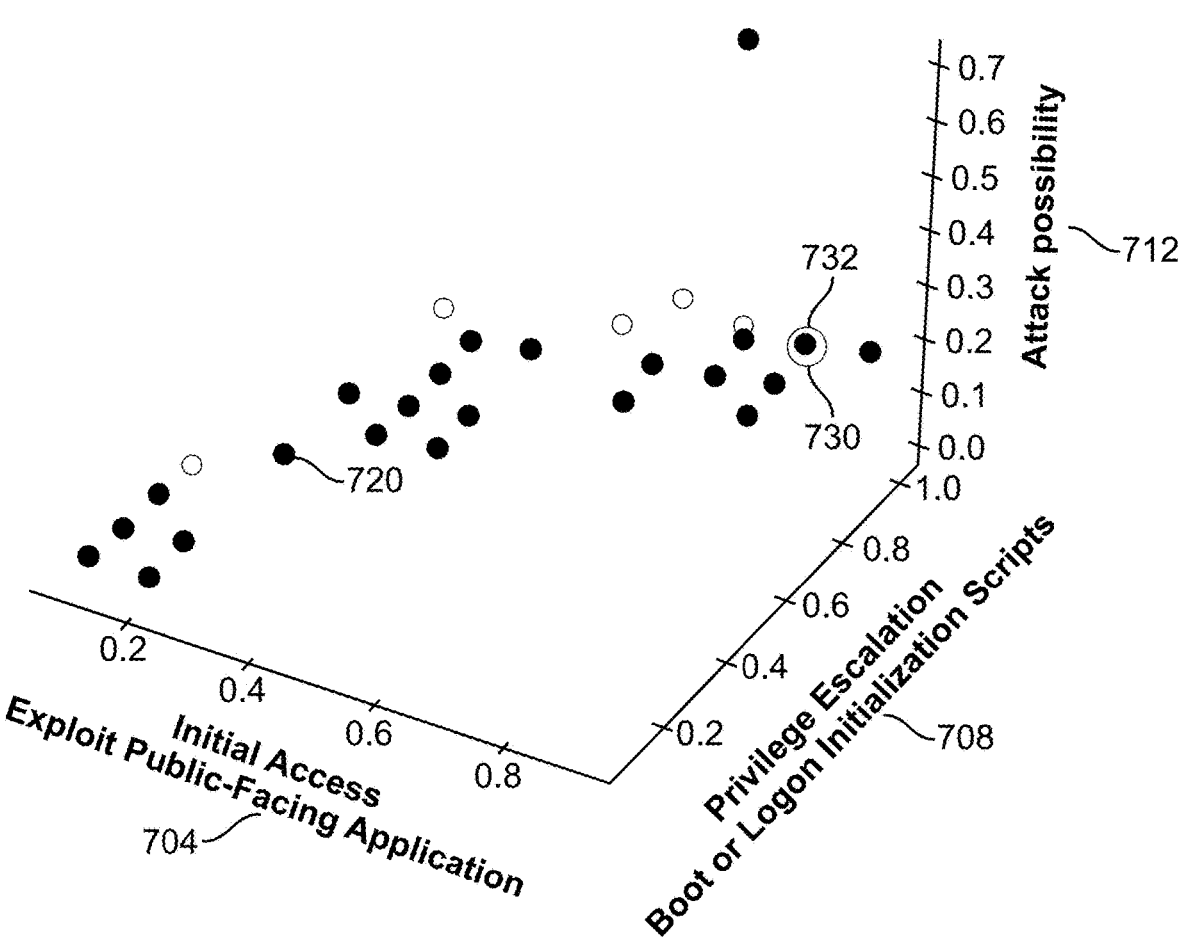
FIG. 11 illustrates an example feature space for possible attack paths stored in a database.

FIG. 11 illustrates an example feature space for possible attack paths stored in database 330. As shown, this example feature space has three dimensions, listed upon three axes 704, 708 and 712. Of course, database 330 includes high-dimensional feature vectors where the dimension may be any number of three or greater (e.g., hundreds). In this simple example, small dots 720 represent the feature vector of attack paths stored in threat intelligence database 330, such as the attack paths described above. Dot 730 is the input feature vector of the input item, in this example, the TCU ECU. Threat scenario builder module 340 uses any suitable algorithm to compare feature vectors of the feature space in order to find the "nearest neighbor" to the input feature vector 730 in this feature space, in this case dot 732, which represents the most likely attack path to be used against the input item. The particular attack path represented by feature vector 732 is then output as a threat scenario 544. An input feature vector may match any number of feature vectors in the feature space, meaning that for a particular item, such as an ECU, there may be any number of potential attack paths. Once such a threat scenario is identified, a suitable countermeasure can be recommended, as each attack path in database 330 is associated with a countermeasure such as a mitigation or detection mechanism.

Each attack path is associated with a countermeasure as follows. In threat intelligence database 330, each attack path with the given input features vector is linked to a countermeasure sub-dataset. Then like the attack path dataset, one uses the same input feature vector to query the countermeasure sub-dataset to obtain the countermeasure result. Further, a threat scenario 544 generated from module 340 will be input to and serve as a template for a threat scenario 370 in the TARA modeling process, because we keep the capability to allow the user to manually modify threat scenarios.

Once module 340 finishes executing, countermeasure advisor module 350 inputs the most likely attack path or paths 544 as well as possible countermeasures from database 330, in order to generate recommended countermeasures 552. The recommended countermeasure or measures provide suggestions including hardware, software, data, keys, and related configurations.

FIG. 7 is a table of recommended countermeasures based upon the above example of the TCU ECU which resulted in the threat scenario (sensitive information exposure) of the attack paths of FIG. 6A. The choice of possible countermeasures from database 330 using the specific attack paths of threat scenario 544 may be explained as follows.

Module 350 proposes countermeasures to the threat scenario 544 of possibly placing IDPS rules in insecure storage based upon the extracted ECU parameters. By way of example, this ECU is based on the ARM Cortex-A55 (ARMv8.2) which supports TrustZone and Hypervisor (non-secure state) software, both of which can be used as an option for secure storage. Because no extra hardware like a TPM (trusted platform module), an HSM (hardware secure module) or SE (Secure Element) is listed in the hardware bill of materials, countermeasure module 350 recommends placing both the IDPS settings and the IDPS rules under Trust-Zone-enabled secure storage (TEE Secure Storage), shown as the first two rows in FIG. 7. In addition, module 350 recommends a third countermeasure, using a derived key for enabling TEE Secure Storage, thus introducing new assets into the TARA modeling process and resulting in another iteration of TARA beginning with asset identification. The proposed countermeasures may also include an IDPS rule or rules to detect threats during system run time. For example, when placing IDPS rules and IDPS settings under Trust-Zone-enabled secure storage, module 350 may provide an unauthorized secure storage access detection rule for the xCarbon engine (for example) to speed up system integration time.

FIG. 8 shows such a rule generated by countermeasure module 350 relating to unauthorized access of IDPS rules or settings in secure storage. This rule is able to detect the threat that uses the attack paths of FIG. 6A (other rules can detect the paths of FIG. 6B). Once module 350 proposes countermeasures (such as the countermeasures of FIGS. 7 and 8) then these countermeasures are output at 552; to the extent that any of these are new assets, these are also sent to asset constructor module 360 for processing and another iteration of the TARA modeling process beginning with asset identification. Further, the countermeasures also input into TARA modeling at 370 in order to accelerate the modeling.

Computer System Embodiment

Figures 12A, 12B:
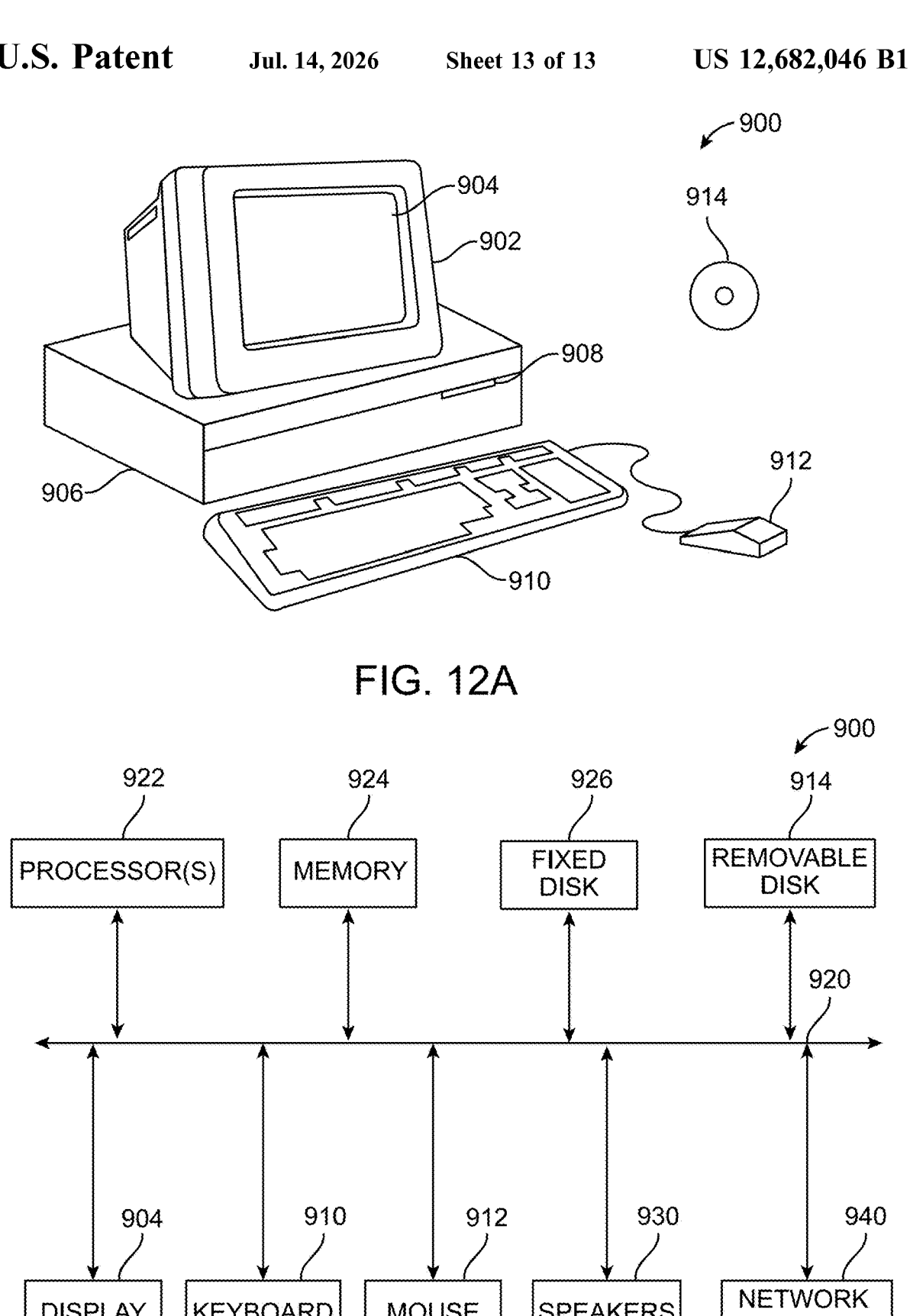
FIGS. 12A and 12B illustrate a computer system suitable for implementing embodiments of the present invention.

FIGS. 12A and 12B illustrate a computer system 900 suitable for implementing embodiments of the present invention. FIG. 12A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 12B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of performing threat assessment and remediation analysis (TARA) for a vehicle, said method comprising:

inputting a vehicle type as an item definition into a TARA modeling process;

extracting vehicular features from said input vehicle type item definition;

generating an input feature vector based upon said vehicular features;

matching, within a multi-dimensional threat intelligence feature space, said input feature vector to one or more feature vectors representing attack paths stored in a threat intelligence database, based on proximity in the multi-dimensional threat intelligence feature space;

selecting a countermeasure of said threat intelligence database associated with said one or more features vector and inputting said countermeasure as a new asset into said TARA modeling process; and downloading said countermeasure from a computer of a manufacturer of said vehicle to said vehicle before completion of manufacturing of said vehicle.

2. The method as recited in claim 1 further comprising:

performing said steps of the method during a design phase of said TARA modeling process.

3. The method as recited in claim 1 further comprising:

perform another iteration of said TARA modeling process due to said inputting said countermeasure as a new asset.

4. The method as recited in claim 1 further comprising:

performing said selecting by following a link in the threat intelligence database of the attack path of said one or more feature vectors to said countermeasure.

5. The method as recited in claim 1 further comprising:

performing said selecting by referencing at least one countermeasure in a record of said threat intelligence database that includes said attack path of said one or more feature vectors.

6. The method as recited in claim 1 further comprising:

extracting at least one electronic control unit (ECU) parameter from said input vehicle type item definition; and generating said input feature vector based upon said vehicular features and said at least one ECU parameter.

7. A method of performing threat assessment and remediation analysis (TARA) for an electronic control unit (ECU) of a vehicle, said method comprising:

inputting an ECU as an item definition into a TARA modeling process;

extracting ECU parameters from said input ECU item definition;

generating an input feature vector based upon said ECU parameters;

matching, within a multi-dimensional threat intelligence feature space, said input feature vector to one or more feature vectors representing attack paths stored in a threat intelligence database, based on proximity in the multi-dimensional threat intelligence feature space;

selecting a countermeasure of said threat intelligence database associated with said one or more feature vectors and inputting said countermeasure as a new asset into said TARA modeling process; and downloading said countermeasure from a computer of a manufacturer of said vehicle to said vehicle before completion of manufacturing of said vehicle.

8. The method as recited in claim 7 further comprising:

performing said steps of the method during a design phase of said TARA modeling process.

9. The method as recited in claim 7 further comprising:

perform another iteration of said TARA modeling process due to said inputting said countermeasure as a new asset.

10. The method as recited in claim 7 further comprising:

performing said selecting by following a link in the threat intelligence database of the attack path of said one or more feature vectors to said countermeasure.

11. The method as recited in claim 7 further comprising:

performing said selecting by referencing at least one countermeasure in a record of said threat intelligence database that includes said attack path of said one or more feature vectors.

12. A method of performing threat assessment and remediation analysis (TARA) for a vehicle, said method comprising:

inputting a vehicle type as an item definition into a TARA modeling process;

extracting vehicular features from said input vehicle type item definition;

generating an input feature vector based upon said vehicular features;

matching, within a multi-dimensional threat intelligence feature space, said input feature vector to one or more feature vectors representing attack paths stored in a threat intelligence database, based on proximity in the multi-dimensional threat intelligence feature space;

selecting a countermeasure of said threat intelligence database associated with said one or more feature vectors and outputting said countermeasure into a countermeasure database that includes selected countermeasures; and downloading said countermeasure from a computer of a manufacturer of said vehicle to said vehicle before completion of manufacturing of said vehicle.

13. The method as recited in claim 12 further comprising:

performing said steps of the method during a design phase of said TARA modeling process.

14. The method as recited in claim 12 further comprising:

inputting said countermeasure as a new asset into said TARA modeling process; and performing another iteration of said TARA modeling process due to said inputting said countermeasure as a new asset.

15. The method as recited in claim 12 further comprising:

performing said selecting by following a link in the threat intelligence database of the attack path of said one or more feature vectors to said countermeasure.

16. The method as recited in claim 12 wherein said countermeasure database is in a computer of a manufacturer of said vehicle.

17. The method as recited in claim 12 further comprising:

extracting at least one electronic control unit (ECU) parameter from said input vehicle type item definition; and generating said input feature vector based upon said vehicular features and said at least one ECU parameter.

18. The method as recited in claim 1, wherein the multi-dimensional threat intelligence feature space has four or more dimensions.

19. The method as recited in claim 7, wherein the multi-dimensional threat intelligence feature space has four or more dimensions.

20. The method as recited in claim 12, wherein the multi-dimensional threat intelligence feature space has four or more dimensions.

\* \* \* \* \*